US008707437B1

(12) United States Patent
Ming-Chang et al.

(10) Patent No.: US 8,707,437 B1
(45) Date of Patent: Apr. 22, 2014

(54) TECHNIQUES FOR DETECTING KEYLOGGERS IN COMPUTER SYSTEMS

(75) Inventors: Shih Ming-Chang, Taipei (TW); Webber Han, Taipei (TW); Peggy Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 204 days.

(21) Appl. No.: 13/088,764

(22) Filed: Apr. 18, 2011

(51) Int. Cl.
*G06F 11/00* (2006.01)
*G06F 21/56* (2013.01)
*G06F 21/83* (2013.01)

(52) U.S. Cl.
CPC ............. *G06F 21/566* (2013.01); *G06F 21/83* (2013.01)
USPC ................................ 726/24; 726/22; 726/23

(58) Field of Classification Search
CPC ................ G06F 21/566; G06F 21/83
USPC ................................................. 726/23, 22, 24
See application file for complete search history.

(56) References Cited

U.S. PATENT DOCUMENTS

| | | | |
|---|---|---|---|
| 7,774,595 B2 * | 8/2010 | Chung Geon et al. | 713/154 |
| 2005/0177649 A1 | 8/2005 | Chung Geon et al. | |
| 2007/0169191 A1 * | 7/2007 | Greene et al. | 726/22 |
| 2007/0180520 A1 * | 8/2007 | Horne | 726/22 |
| 2007/0263872 A1 | 11/2007 | Kirkup et al. | |
| 2008/0016339 A1 * | 1/2008 | Shukla | 713/164 |
| 2009/0044266 A1 * | 2/2009 | Sharp et al. | 726/14 |
| 2009/0070595 A1 | 3/2009 | Delia et al. | |
| 2009/0241196 A1 * | 9/2009 | Troyansky et al. | 726/25 |
| 2010/0037064 A1 | 2/2010 | Ku | |
| 2010/0071063 A1 * | 3/2010 | Wang et al. | 726/23 |
| 2010/0195825 A1 | 8/2010 | Cini | |
| 2010/0228994 A1 * | 9/2010 | Kang | 713/189 |
| 2010/0269165 A1 * | 10/2010 | Chen et al. | 726/7 |

OTHER PUBLICATIONS

Ortolani et al., Bait Your Hook, 2010, Retrieved from the Internet <URL: springerlink.com/content/j5140u267021m6r2/>, pp. 1-20 as printed.*
Vasudevan, MalTRAK: Tracking and Eliminating Unknown Malware, 2008, Retrieved from the Internet <URL: ieeexplore.ieee.org/xpls/abs_all.jsp?arnumber=4721568&tag=1>, pp. 1-11 as printed.*
Keystroke logging—Wikipedia, the free encyclopedia, 10 pages [retrieved on Apr. 6, 2011], retrieved from the internet: http://en.wikipedia.org/wiki/Keystroke_logging.

* cited by examiner

*Primary Examiner* — Michael Chao
(74) *Attorney, Agent, or Firm* — Okamoto & Benedicto LLP

(57) ABSTRACT

Keyloggers are detected in a computer. A test string is generated in the computer. Keyboard input is simulated using the test string. The test string may be input to a hidden browser connected to a sensitive site or a hidden application program, for example. Files modified during the input procedure are detected. Processes running in memory and modified files are scanned for presence of the test string to detect keyloggers.

16 Claims, 8 Drawing Sheets

TECHNIQUES FOR DETECTING KEYLOGGERS IN COMPUTER SYSTEMS

BACKGROUND OF THE INVENTION

1. Field of the Invention

The present invention relates generally to computer security, and more particularly but not exclusively to methods and apparatus for detecting keyloggers.

2. Description of the Background Art

Keyloggers track and record keys struck on a keyboard. While keyloggers may be employed for legitimate purposes, they are typically employed in a covert manner to steal confidential information, such as passwords and account information, entered by way of a keyboard of an infected computer.

Keyloggers may be implemented in hardware or software. Hardware based keyloggers require physical access to the computer to install a keystroke recording device. Hardware based keyloggers are thus harder to deploy compared to software based keyloggers. Software based keyloggers are a form of malicious code and may thus be easily propagated by infecting unprotected computers. A keylogger may steal confidential information from an infected computer for subsequent transmission to a remotely located computer operated or controlled by a cyber criminal.

FIG. 1 schematically illustrates example keystroke processing in a conventional computer. In the example of FIG. 1, the computer comprises a keyboard 150 that is electrically connected to a main module 160. The main module 160 may be a motherboard, for example. In operation, a keyboard input is generated by pressing a key of the keyboard 150. A key matrix 151 detects the location of the particular key that was pressed and forwards the location information to a keyboard processor and read only memory (ROM) 152 (arrow 171). The keyboard processor and ROM 152 translates the location information to a character or control code, which is transmitted to a keyboard controller 161 for processing as the keyboard input (arrow 172). A keyboard driver 163 of the operating system 162 receives the keyboard input (arrow 173), which is subsequently forwarded to an application 164 intended to receive the keyboard input (arrow 174).

Keyboard inputs may be monitored at various points in the computer. For example, keyboard inputs may be monitored using an electrical circuit connected between the keyboard 152 and the main module 160, such as inline with the keyboard's cable connector. Keyboard inputs may also be monitored at the kernel level by using kernel driver and hooking on the interrupt descriptor table, monitoring I/O (input/output) port status, or replacing the operating system's keyboard driver. At the application level, keyboard inputs may be monitored using an application programming interface (API) hook, using a form grabber, or by capturing network traffic, to name some examples.

Hardware based keyloggers may be detected by physical inspection and securing the location of the computer. Software based keyloggers, being a form of malicious code, are more problematic for the average computer user as they are easily contracted, such as by receiving infectious files over a computer network or from computer-readable storage medium inserted into the computer.

There are various ways of protecting a computer from malicious code that is configured as a keylogger. Example methods include using a virtual keyboard, automatic form filler, or speech recognition. While these methods may prevent a keylogger from monitoring and logging keyboard inputs, they do not detect the presence of the keylogger. That is, the keylogger remains in the infected computer to monitor keyboard inputs, i.e., inputs entered by way of the physical keyboard 150. Antivirus software may be employed to detect software based keyloggers using pattern-matching and heuristic algorithms. However, because of the large number of keyloggers and their variants, the size of the pattern file containing the keylogger patterns may get very big. Furthermore, the behavior of keyloggers operating at the kernel level is relatively difficult to detect.

SUMMARY

In one embodiment, a computer-implemented method of detecting a keylogger in a computer comprises generating a test string. Simulated keyboard input is performed using the test string. Files that have been modified during a procedure of performing the simulated keyboard input are detected. Modified files are scanned for presence of the test string to detect the keylogger.

In another embodiment, a computer comprises a processor and a memory, the memory comprises computer-readable program code configured to be executed by the processor to generate a test string, to use the test string to simulate a keyboard input, and to detect a keylogger by scanning files and processes of the computer for presence of the test string.

In yet another embodiment, a computer-implemented method of detecting a keylogger in a computer comprises randomly generating a test string. The test string is written into an I/O port of the computer for accepting a keyboard input. The keylogger is detected by scanning files and processes for presence of the test string.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
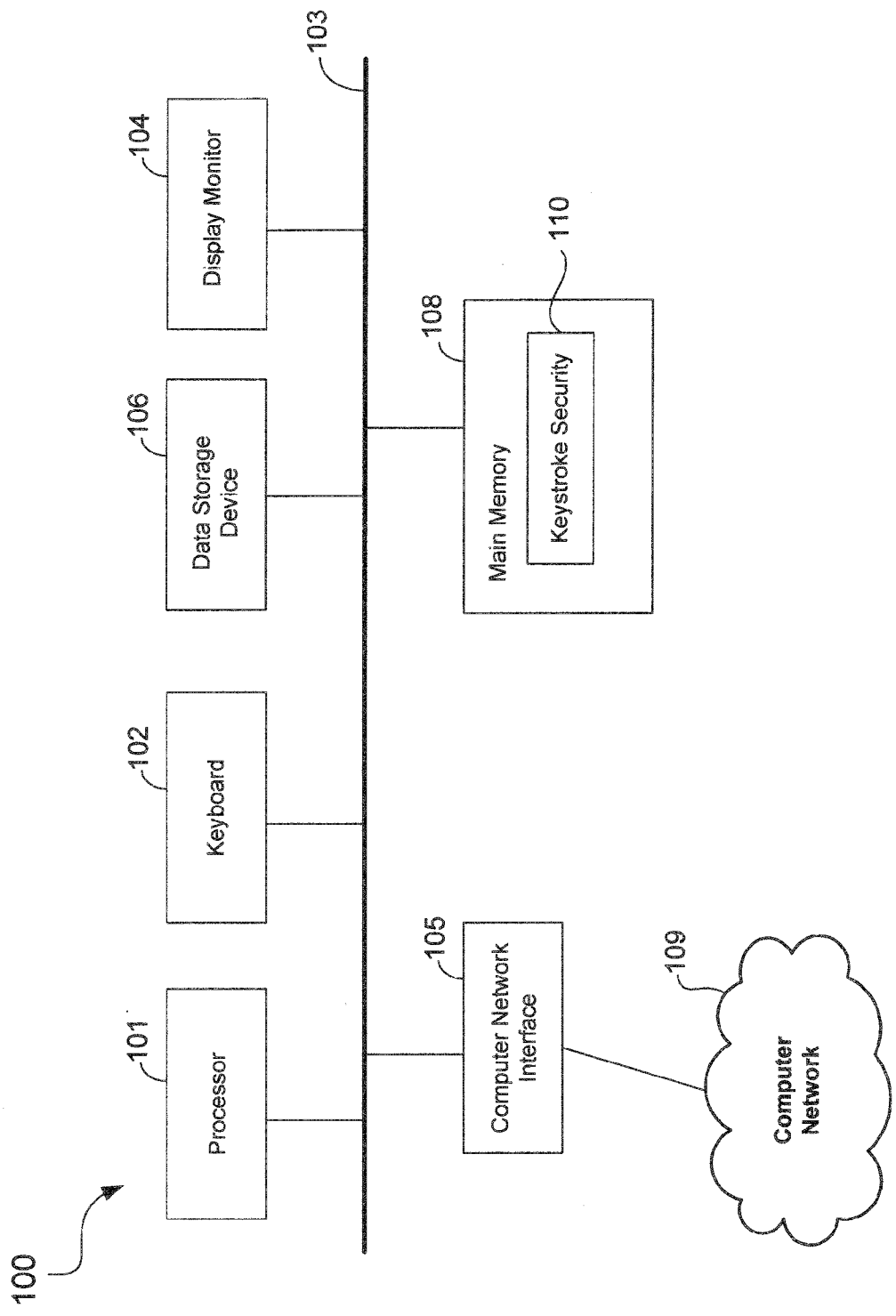
FIG. 2 shows a schematic diagram of a computer in accordance with an embodiment of the present invention.

Referring now to FIG. 2, there is shown a schematic diagram of a computer 100 in accordance with an embodiment of the present invention. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include a keyboard 102 and other user input devices (e.g., mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109.

The computer 100 is a particular machine as programmed with computer-readable program code. In the example of FIG. 2, the main memory 108 contains computer-readable program code including a keystroke security module 110. The keystroke security module 110 may comprise computer-readable program code stored non-transitory in the main memory 108 for execution by the processor 101. The keystroke security module 110 may be loaded from the data storage device 106 to the main memory 108. The keystroke security module 110 may also be made available in other computer-readable medium including optical disk, flash drive, and other memory device.

Figure 1:
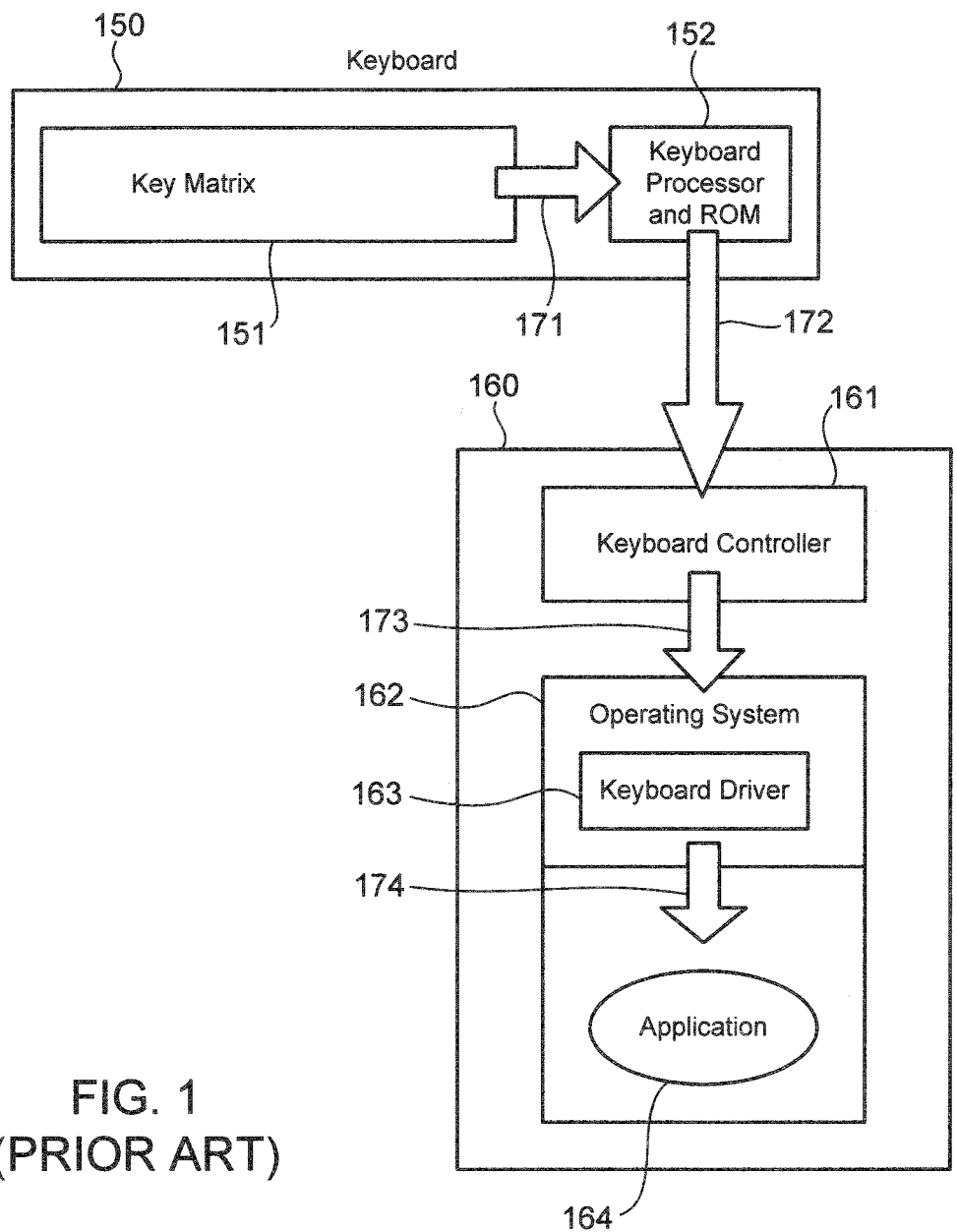
FIG. 1 schematically illustrates example keystroke processing in a conventional computer.
Figure 3:
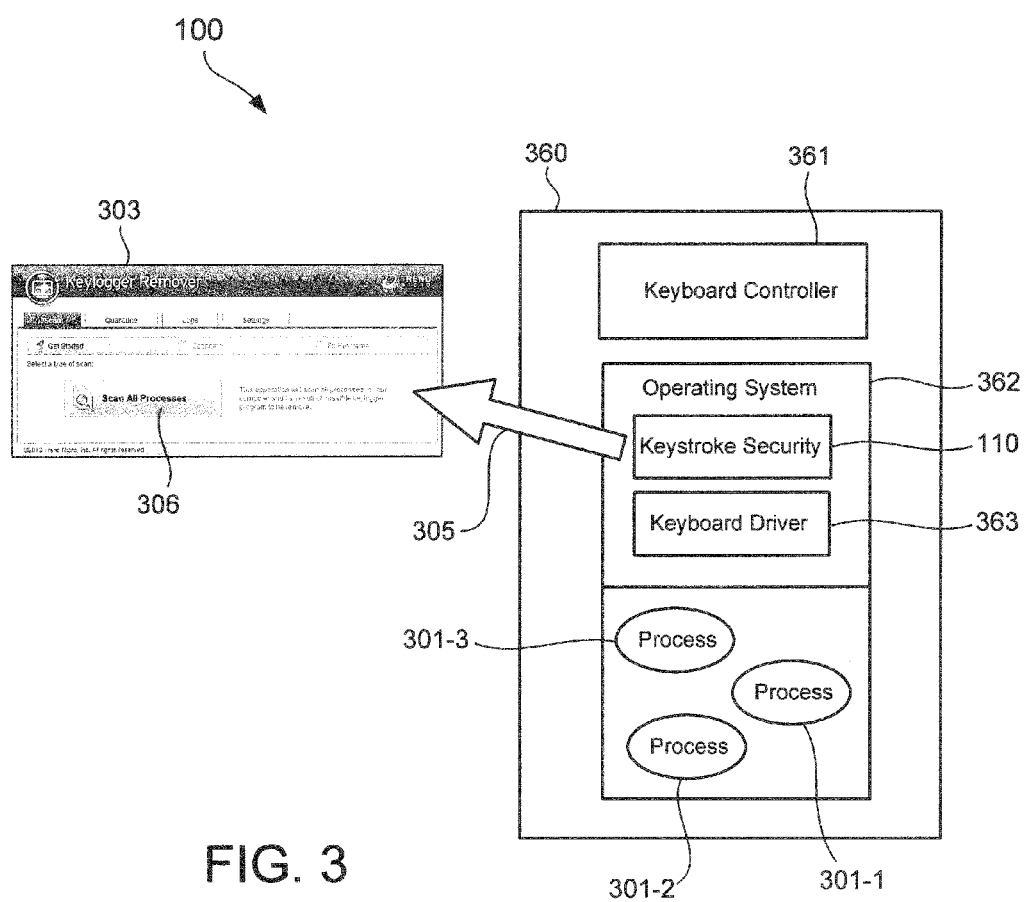
FIG. 3 schematically shows further details of the computer of FIG. 2 in accordance with an embodiment of the present invention.

FIG. 3 schematically shows further details of the computer 100 in accordance with an embodiment of the present invention. In the example of FIG. 3, the computer 100 includes a main module 360 (e.g., motherboard) containing a keyboard controller 361 and previously introduced components of the computer 100, including the processor 101 and the main memory 108 (see FIG. 1). The main memory 108 contains the processes 301 (i.e., 301-1, 301-2, 301-3) and the operating system 362. In the example of FIG. 3, the keystroke security module 110 and the keyboard driver 363 runs in kernel mode and the processes 301 run in user mode. A process 301 may be an application program, such as a web browser, instant messaging (IM) application, ftp application, etc., running in user memory space of the main memory 108.

The keystroke security module 110 may comprise computer-readable program code configured to be executed by the processor 101 to detect malicious codes configured as a keystroke logger. The keystroke security module 110 may be configured to generate a user interface 303 (arrow 305). In one embodiment, activating a button 306 (e.g., using a mouse) of the user interface 303 initiates detection of keyloggers by the keystroke security module 110. The keystroke security module 110 may include components running in kernel mode. In one embodiment, the keystroke security module 110 includes a file system driver running kernel mode to detect file modification. The keystroke security module 110 may also include components running in user mode, e.g., to scan processes running in user memory space.

In one embodiment, the keystroke security module 110 is configured to randomly generate a test string, use the test string to simulate a keyboard input, and detect a keylogger by scanning files and processes 301 for presence of the test string. The operation of the keystroke security module 110 in accordance with this embodiment is now described with reference to FIG. 4.

Figure 4:
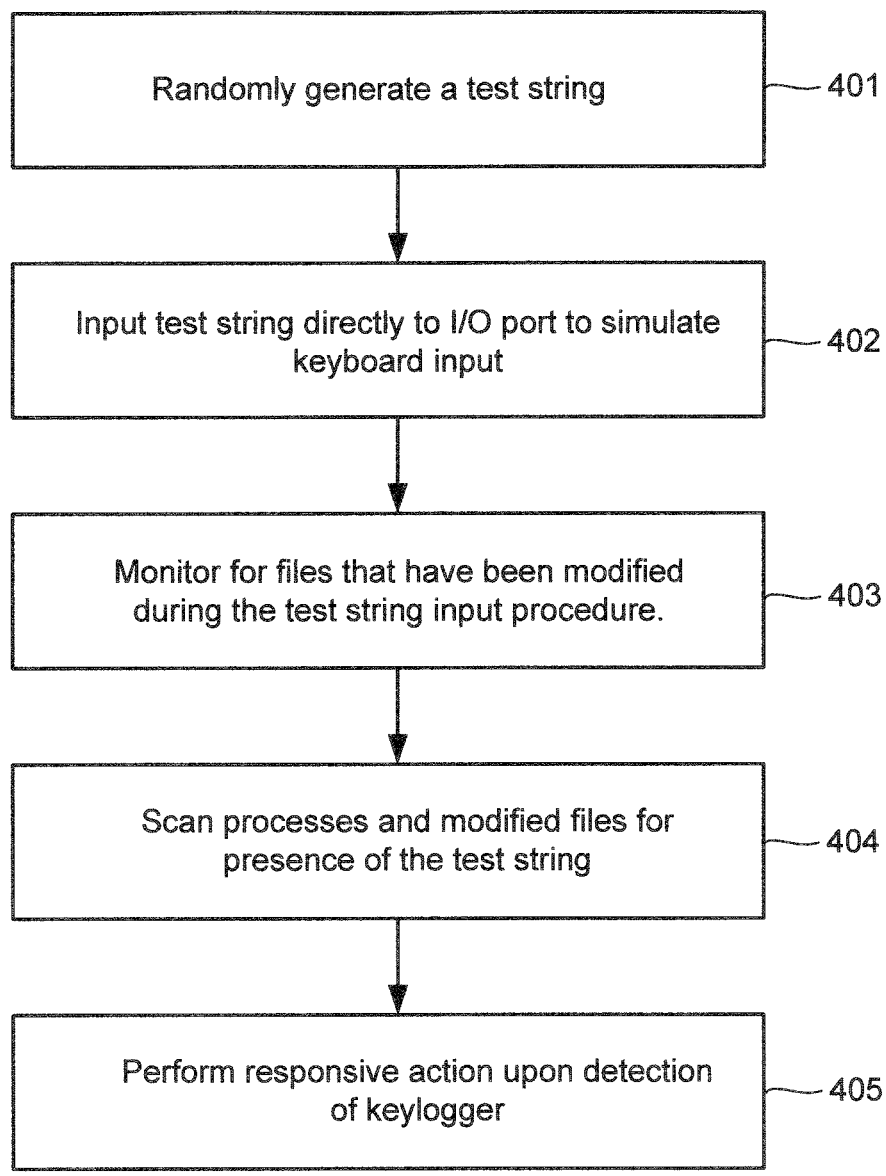
FIG. 4 shows a flow diagram of a method of detecting a keylogger in accordance with an embodiment of the present invention.

FIG. 4 shows a flow diagram of a method of detecting a keylogger in accordance with an embodiment of the present invention. In the example of FIG. 4, the keylogger being detected comprises malicious code configured to monitor and steal confidential information entered by way of a keyboard, i.e., malicious code configured as a keylogger. The method of FIG. 4 is explained using the components of FIGS. 2 and 3 for illustration purposes only. Other components may also be employed without detracting from the merits of the present invention.

The method of FIG. 4 may begin with the keylogger security module 110 displaying the user interface 303 on the display monitor 104 of the computer 100. When the button 306 of the user interface 303 is activated, the keyboard security module 110 initiates detection of the keylogger by generating a string, also referred to herein as a "test string" (step 401). In one embodiment, the keyboard security module 110 randomly generates the test string. The test string may comprise alphabetic, numeric, or alphanumeric characters, for example.

Preferably, to prevent false positives, the test string is unique and readily identifiable as being generated by the keyboard security module 110. For example, the test string may comprise a non-existent email address, such as "wahaha@com.tw". Only the keystroke security module 110, such as its file and/or process, is expected to have the test string. Therefore, any other file or process containing the test string may be deemed to be a keylogger.

The keystroke security module 110 simulates a keyboard input by writing the test string directly to an I/O port for accepting keyboard inputs (step 402). This allows for test string input without using the keyboard 102. The keystroke security module 110 may monitor for files that have been modified during the test string input procedure (step 403). For example, the keystroke security module 110 may include a file system driver running in kernel mode. The file system driver may monitor for files that have been modified during a window of time that includes the inputting of the test string into the I/O port. The keystroke security module 110 scans the modified files and the processes 301 for presence of the test string (step 404). Because no other process or file is expected to receive the test string, the keystroke security module 110 may deem a file or process 301 that contains the test string as being a keylogger. The keystroke security module 110 may perform a responsive action upon detection of a keylogger (step 405), including directing an antivirus to scan the particular file or process for further verification to minimize false positives, putting the file in quarantine, terminating the process, and/or alerting a system administrator or user (e.g., by displaying a warning message, sending an alert email, etc.). As can be appreciated, detection of the presence of the keylogger in the computer allows the user to avoid using the computer until the keylogger is removed. This approach is much more effective than simply trying to prevent the keylogger from monitoring keyboard inputs while the keylogger remains undetected in the computer.

In another embodiment, the keystroke security module 110 is configured to open a hidden browser to a sensitive site, randomly generate a test string, sign-on to the sensitive site using the test string, and detect a keylogger by scanning files and processes 301 for presence of the test string. The operation of the keystroke security module 110 in accordance with this embodiment is now described with reference to FIGS. 5 and 6.

Figure 5:
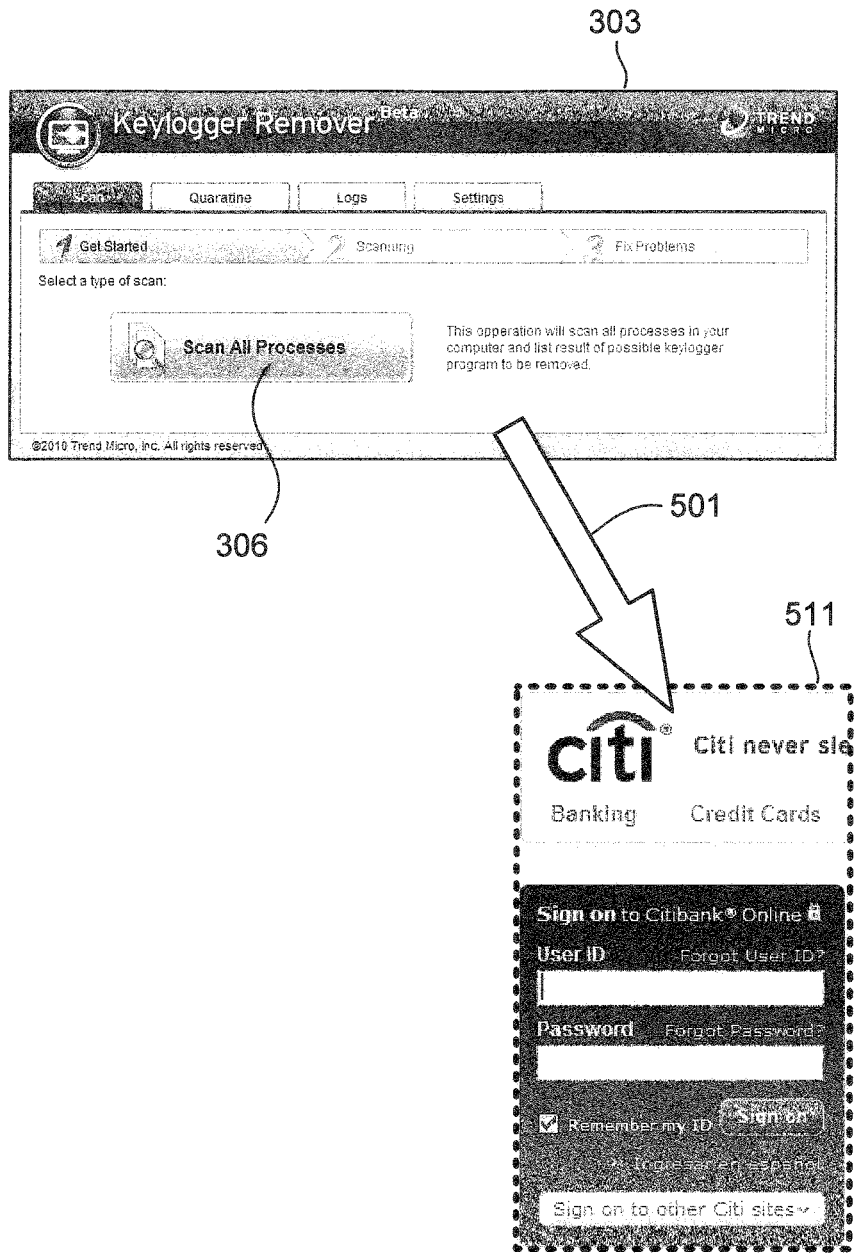
FIG. 5 schematically shows a keystroke security module opening a hidden browser to a sensitive site in accordance with an embodiment of the present invention.

FIG. 5 schematically shows the keystroke security module 110 opening a hidden browser to a sensitive site in accordance with an embodiment of the present invention. In the example of FIG. 5, activating the button 306 of the user interface 303 results in the keystroke security module 110 opening a hidden web browser window 511 that connects to a sensitive website (arrow 501). In the example of FIG. 5, the sensitive website is that of an online bank, and the web browser window 511 displays a sign-on web page of the bank. The web browser window 511 is depicted with a dashed border to indicate that it is hidden from user view. For example, the keystroke security module 110 may open the web browser window 511 to be displayed in the background. In that case, the user may see the web browser window 511 for a brief moment before flickering away to the background. It is to be noted that the web browser window 511 may be connected to an actual sensitive site without having to maintain an account with the site. In that case, signing onto the account using the test string will result in a sign-on failure. This does not affect keylogger detection because keyloggers typically harvest passwords and account information without verifying whether or not the passwords and account information are legitimate.

Figure 6:
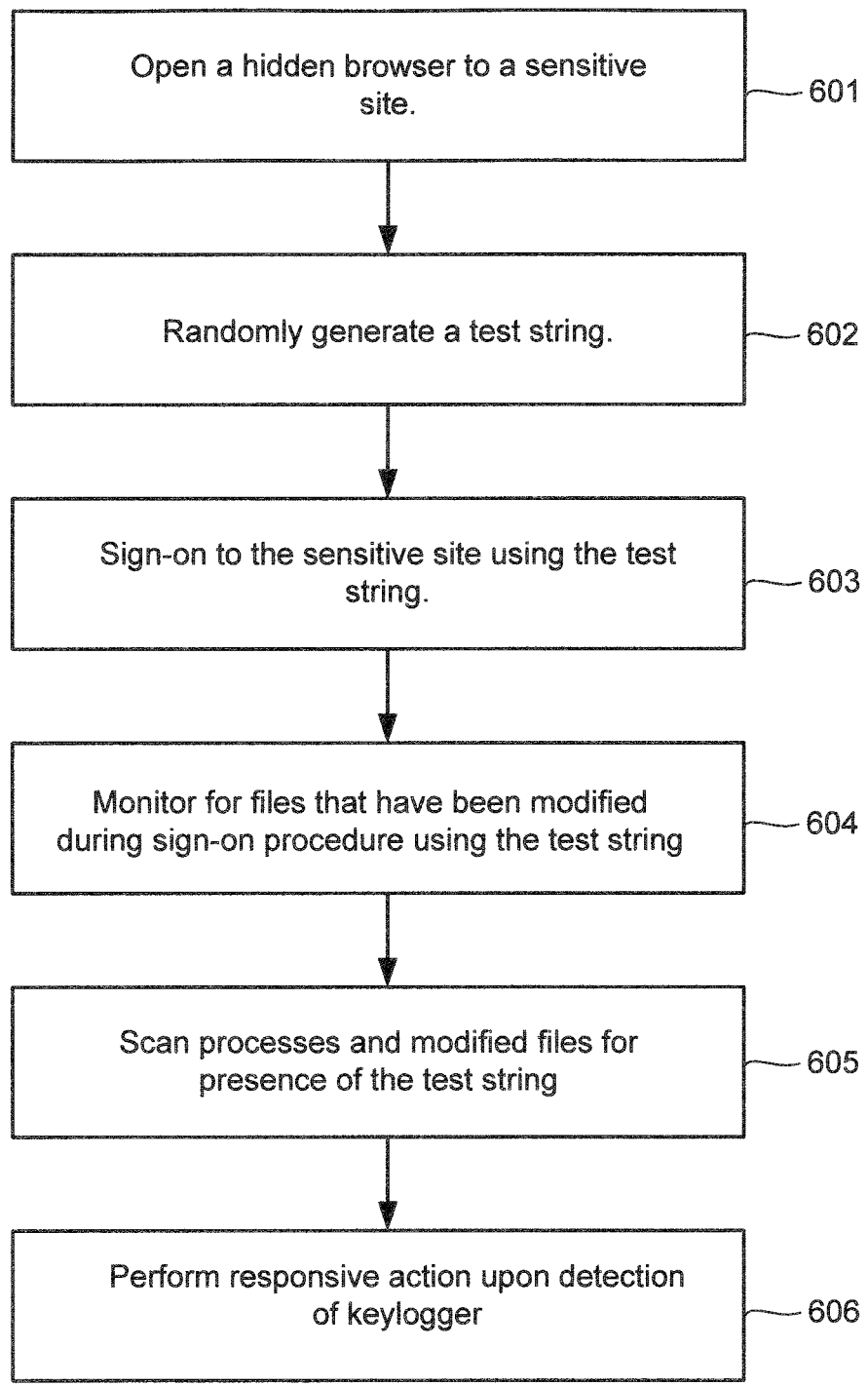
FIG. 6 shows a flow diagram of a method of detecting a keylogger in accordance with an embodiment of the present invention.

FIG. 6 shows a flow diagram of a method of detecting a keylogger in accordance with an embodiment of the present invention. In the example of FIG. 6, the keylogger being detected comprises malicious code configured as a keylogger. The method of FIG. 6 is explained using the components of FIGS. 2, 3, and 5 for illustration purposes only. Other components may also be employed without detracting from the merits of the present invention.

The method of FIG. 6 may begin with the keylogger security module 110 displaying the user interface 303 on the display monitor 104. When the button 306 of the user interface 303 is activated, the keyboard security module 110 opens a hidden web browser window 511 to a sensitive website (step 601). The keyboard security module 110 generates a test string (step 602). In one embodiment, the keyboard security module 110 randomly generates the test string. The test string may comprise alphabetic, numeric, or alphanumeric characters, for example.

The keystroke security module 110 uses the test string to sign onto the sensitive website (step 603). For example, the keystroke security module 110 may enter the test string to a password entry field and the user ID field of the web page displayed on the web browser window 511. The keystroke security module 110 may simulate keyboard entry to enter the test string into fields of the web page. For example, the keystroke security module 110 may enter the test string by directly writing the test string to an I/O port for keyboard input. Using the test string as an input to a web page of a sensitive website increases the chance that any keylogger monitoring keyboard inputs in the computer 100 will harvest and log the test string.

The keystroke security module 110 may monitor for files that have been modified during the sign-on procedure (step 604). For example, the file system driver of the keystroke security module 110 may monitor for files that have been modified during a window of time that includes the time when the test string is employed to sign onto the sensitive website. The keystroke security module 110 scans the modified files and the processes 301 for presence of the test string (step 605). In one embodiment, the keystroke security module 110 deems a file or process 301 that contains the test string as being a keylogger. The keystroke security module 110 may perform a responsive action upon detection of a keylogger (step 606).

In another embodiment, the keystroke security module 110 is configured to open a hidden application, randomly generate a test string, input the test string into the application, and detect a keylogger by scanning files and processes 301 for presence of the test string. The operation of the keystroke security module 110 in accordance with this embodiment is now described with reference to FIGS. 7 and 8.

Figure 7:
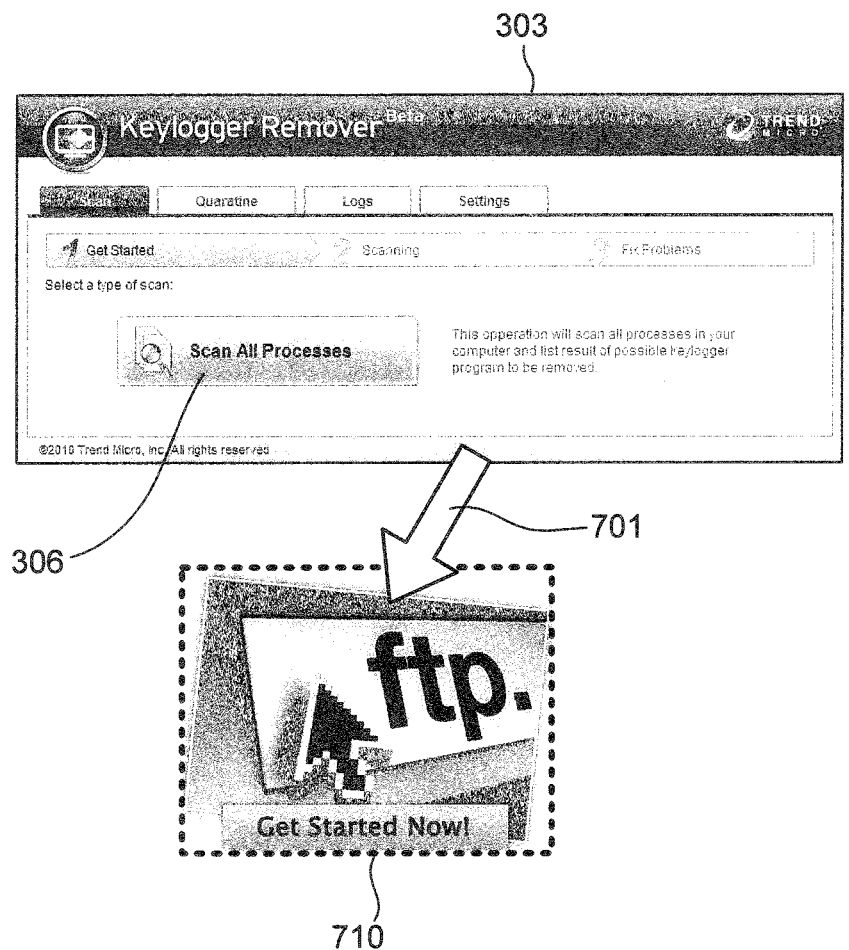
FIG. 7 schematically shows a keystroke security module opening a hidden application program in accordance with an embodiment of the present invention.

FIG. 7 schematically shows the keystroke security module 110 opening a hidden application program in accordance with an embodiment of the present invention. In the example of FIG. 7, activating the button 306 of the user interface 303 results in the keystroke security module 110 opening a hidden application 710 (arrow 701). The application 710 may be an FTP (file transfer protocol) program, an Instant Messaging (IM) program, or other application program. The application 710 is preferably a well-known, popular application program to increase the chance that any keylogger monitoring keyboard inputs in the computer 100 detects the opening of the application 710 and starts harvesting keyboard inputs to it. The application 710 is depicted with a dashed border to indicate that it is hidden from user view. For example, the keystroke security module 110 may open the application 710 to be displayed in the background.

Figure 8:
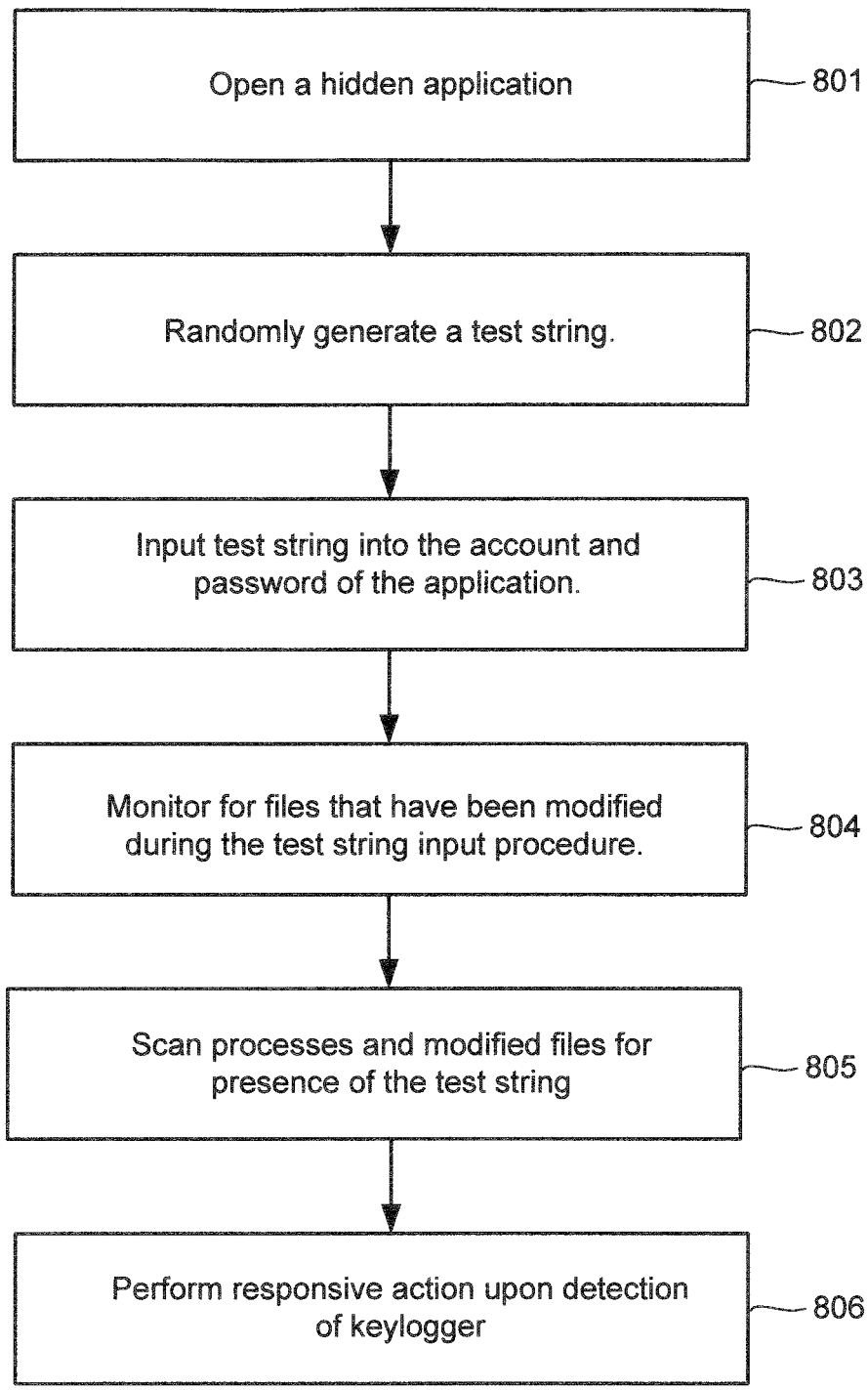
FIG. 8 shows a flow diagram of a method of detecting a keylogger in accordance with an embodiment of the present invention.

FIG. 8 shows a flow diagram of a method of detecting a keylogger in accordance with an embodiment of the present invention. In the example of FIG. 8, the keylogger being detected comprises malicious code configured as a keylogger. The method of FIG. 8 is explained using the components of FIGS. 2, 3, and 7 for illustration purposes only. Other components may also be employed without detracting from the merits of the present invention.

The method of FIG. 8 may begin with the keylogger security module 110 displaying the user interface 303 on the display monitor 104. When the button 306 of the user interface 303 is activated, the keyboard security module 110 opens a hidden application 710 (step 801). The keyboard security module 110 generates a test string (step 802). In one embodiment, the keyboard security module 110 randomly generates the test string. The test string may comprise alphabetic, numeric, or alphanumeric characters, for example.

The keystroke security module 110 inputs the test string into the application 710 (step 803). For example, the keystroke security module 110 may enter the test string to a password entry field and/or account ID field of the application 710. Examples of application programs with a password entry field or account ID field include FTP programs for uploading/downloading files and instant messaging programs. As can be appreciated, the test string may also be entered into other fields or data entry area likely to be monitored by a keylogger. The keystroke security module 110 may simulate keyboard entry to enter the test string into the application 710. For example, the keystroke security module 110 may input the test string by directly writing the test string to an I/O port for keyboard input. Using the test string as an input to an application program increases the chance that any keylogger monitoring keyboard inputs in the computer 100 will harvest and log the test string.

The keystroke security module 110 may monitor for files that have been modified during the test string input procedure (step 804). For example, the file system driver of the keystroke security module 110 may monitor for files that have been modified during a window of time that includes the time when the test string is input into the application 710. The keystroke security module 110 scans the modified files and the processes 301 for presence of the test string (step 805). In one embodiment, the keystroke security module 110 deems a file or process 301 that contains the test string as being a keylogger. The keystroke security module 110 may then perform a responsive action upon detection of a keylogger (step 806).

As can be appreciated from the foregoing, embodiments of the present invention provide significant advantages. For one, unlike previous approaches that simply try to prevent monitoring of keyboard inputs by a keylogger, embodiments of the present invention allow for detection of presence of the keylogger, making the computer safer in the long run. Furthermore, embodiments of the present invention allow for detection of keyloggers without necessarily having to use pattern files containing patterns of keyloggers. Yet another advantage, unlike heuristic-based approaches that require continuous monitoring of program behavior, embodiments of the present invention may be activated on as needed basis and do not necessarily require pattern files containing keylogger behavior patterns.

Methods and apparatus for detecting keyloggers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting a keylogger in a computer, the method comprising:
   the computer generating a test string;
   the computer writing the test string directly to an I/O (input/output) port of the computer for accepting keyboard input to perform a simulated keyboard input using the test string;
   the computer monitoring for files that are modified during writing of the test string directly to the I/O port using a file system driver that monitors for file modifications in kernel mode;
   the computer identifying a file detected by the file system driver as having been modified during the simulated keyboard input; and
   after identifying the file as having been modified during simulated keyboard input, the computer detecting the keylogger by scanning the file for presence of the test string.

2. The computer-implemented method of claim 1 wherein the test string is randomly generated by the computer.

3. The computer-implemented method of claim 1 further comprising:
   connecting a hidden web browser window to a sensitive website, and wherein the computer enters the test string into a password entry field of a web page of the sensitive website displayed on the hidden web browser window.

4. The computer-implemented method of claim 3 wherein the sensitive website is an online banking website.

5. The computer-implemented method of claim 1 wherein the computer inputs the test string to an application program.

6. The computer-implemented method of claim 5 wherein the application program comprises a file transfer protocol (FTP) program.

7. The computer-implemented method of claim 5 wherein the computer displays the application program in a background hidden from user view.

8. The computer-implemented of claim 1 further comprising:
   the computer detecting the keylogger by scanning processes running in a memory of the computer for presence of the test string.

9. A computer comprising a processor and a memory, wherein the computer generates a test string, uses the test string to simulate entry of a keyboard input by writing the test string directly into an I/O (input/output) port of the computer for accepting keyboard input, uses a file system driver that monitors for file modifications in kernel mode to monitor for files that are modified during the simulated entry of the keyboard input, identifies a file detected by the file system driver as having been modified during the simulated entry of the keyboard input, and detects a keylogger by scanning the file for presence of the test string after the file has been identified as having been modified during the simulated entry of the keyboard input.

10. The computer of claim 9 wherein the computer randomly generates the test string.

11. The computer of claim 9 wherein the computer inputs the test string to a hidden application program.

12. The computer of claim 9 wherein the computer inputs the test string to a hidden web browser connected to a sensitive website.

13. A computer-implemented method of detecting a keylogger in a computer, the method comprising:
   the computer generating a test string;
   the computer writing the test string into an I/O (input/output) port of the computer for accepting a keyboard input;
   the computer entering the test string into a hidden window;
   the computer monitoring for one or more files that are modified during entry of the test string into the hidden window using a file system driver that monitors for file modifications in kernel mode;
   the computer identifying a file that has been detected by the file system driver as having been modified during entry of the test string into the hidden window; and
   the computer detecting the keylogger by scanning the file identified as having been modified during entry of the test string into the hidden window for presence of the test string.

14. The computer-implemented method of claim 13 wherein the hidden window comprises a hidden web browser window, the computer connects the hidden browser window to a sensitive website, and the computer enters the test string into a password entry field of a web page of the sensitive website displayed on the hidden browser window.

15. The computer-implemented method of claim 13 wherein the computer enters the test string into the hidden window of an application program.

16. The computer-implemented method of claim 13 wherein the computer displays the application program in a background hidden from user view.

* * * * *